March 5, 1968 R. L. LICH 3,371,622
ARTICULATED CAR
Filed Oct. 18, 1965
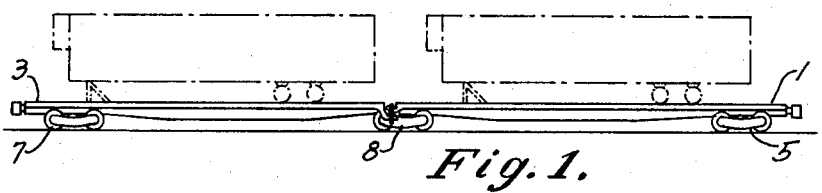
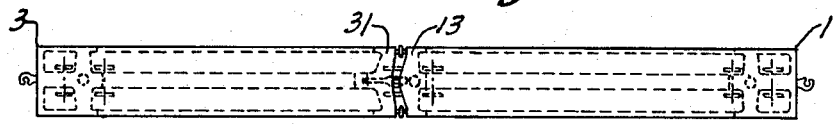
Fig. 1.
Fig. 2.
Fig. 3.
Fig. 4.
Fig. 5.
INVENTOR
RICHARD L. LICH
BY Bedell & Burgess
ATTORNEYS

United States Patent Office 3,371,622
Patented Mar. 5, 1968

3,371,622
ARTICULATED CAR
Richard L. Lich, St. Louis, Mo., assignor to General Steel Industries, Inc., Granite City, Ill., a corporation of Delaware
Filed Oct. 18, 1965, Ser. No. 497,157
3 Claims. (Cl. 105—4)

ABSTRACT OF THE DISCLOSURE

An articulated railway car in which one underframe is supported near one of its ends on a truck and has transversely spaced upwardly facing hooks on that end, vertical links suspended from said hooks, and a second underframe having downwardly facing hooks on its end adjacent the first underframe, the downwardly facing hooks being supported from said links and forming therewith the sole support of the adjacent end of the second underframe, and draft means comprising a drawbar pivoted to the second underframe on a horizontal axis and universally pivoted to the first underframe.

---

The invention relates to railway rolling stock and consists particularly in an improved articulated car construction especially adapted for hauling highway trailers.

In conventional articulated cars, the abutting ends of both body units are supported on a common truck centerplate through which all buff and draft forces are transmitted between the body units, and are provided with interengaging side bearings to limit lateral roll of the bodies relative to each other. Conventional articulation has been adequate for passenger cars but for cars operated in long, heavy freight trains, the buff and draft loads on the centerplate are excessive and for cars with high loads, such as highway trailer units, the means opposing relative roll of the long conventional articulated cars may be inadequate. Articulated cars are desirable for highway trailer movement because the typical highway trailer is a relatively light load, well below the capacity of the two trucks of a conventional flat car. While many cars now in service are long enough (85 feet) to accommodate two 40-foot conventional trailers, any substantial increase in the length of the standard trailer (to 45 feet, for example) will make it impossible to carry two trailers on the present long cars. The length of the latter cannot be substantially exceeded because of curvature and clearance limitations of the railroads.

Objects of the invention include providing a car of sufficient length to carry more than one extra length highway trailer, yet capable of operating within the physical and clearance limitation of most existing railroad trackage; providing a three-truck car for carrying two highway trailers whereby to minimize the number of railroad wheels, axles, journal bearings, and consequent draft on such a car; providing an articulated car with improved lateral stability, and with means other than the centerplate for transmitting draft and buff forces and vertical load from one body unit to the other; and providing an articulated car in which one of the body units is supported from the sides rather than at the center of the other.

A further object is to provide a compatible draft connection between two body units of an articulated car in which one of the body units is supported from the other by universally swingable links depending from the ends of the other unit adjacent its ends.

The foregoing and additional objects and advantages are achieved by the construction described hereinafter and illustrated by the accompanying drawings in which:

FIG. 1 is a side elevation view of a trailer carrying car embodying the invention.

FIG. 2 is a plan view of the car illustrated in FIG. 1.

FIG. 3 is an enlarged top view of the articulation connection.

FIG. 4 is an enlarged side elevation view of the articulation connection.

FIG. 5 is a longitudinal vertical sectional view along the longitudinal center line 5—5 of FIG. 3.

The car comprises a pair of elongated underframes 1 and 3, supported at their remote ends on trucks 5 and 7.

Underframe 1 is supported at its end adjacent underframe 3 on intermediate truck 8, and underframe 3 is supported at its adjacent end from underframe 1.

Underframe 1 includes a longitudinally extending center sill 9 and spaced side sills 11. The articulated end of underframe 1 comprises a transversely extending box section body bolster-end sill member 13, preferably of cast metal construction and provided with central and side longitudinal projections 15 and 17 for securement, as by welding, to the adjacent end portions of center sill 9 and side sills 11. Intermediate the sides of underframe 1, end member 13 is formed with a depending cylindrical centerplate 19 for pivotal support on the mating centerplate 21 of intermediate truck 8.

Adjacent the sides of underframe 1, end member 13 is formed with upwardly facing hooks 23 extending outwardly longitudinally of the car from the end of underframe 1 and end member 13 is bowed longitudinally outwardly between hook 23 and at its center is formed with a longitudinally outwardly open drawbar recess 25 in substantial alignment transversely of the underframe with hook 23 and in longitudinal alignment with center sill 9. Hook 23 and recess 25 are positioned as close as possible to the transverse center line of truck 8.

Underframe 3 includes a longitudinally extending center sill 27, similar to sill 9, and transversely spaced longitudinally extending side sills 29. The articulation end of underframe 3 comprises a transversely extending end sill member 31, having central and side longitudinal projections 30 and 32 for securement to center and side sills 27 and 29, and is formed adjacent the sides of the underframe with depending downwardly facing hooks 33 extending outwardly longitudinally of the car from the end of underframe 3.

For supporting underframe 3 vertically from underframe 1, links 35 are carried by hooks 23 on end member 13 of underframe 1 and depend vertically therefrom, at their lower ends underlyingly engaging hooks 33 on end member 31 of underframe 3. With this arrangement, the two underframes can angulate with respect to each other in the horizontal plane for rounding curves and, since the adjacent end of underframe 3 is not supported on a truck, but is supported solely by links 35, it will at all times follow the transverse inclination of underframe 1.

To provide a draft connection between the two underframes which will accommodate variations in the height of the underframes resulting from tilting of links 35 when rounding curves, while maintaining the line of draft in substantial alignment vertically with the two underframes, the center sill extension 30 of end member 31 is elongated and a drawbar recess 39 elongated longitudinally of the car is formed within end member 31 and extension 30 in longitudinal alignment with center sill 27. The end wall of end member 31 is recessed inwardly lengthwise of the car to conform to the outward bowing of end member 13. An elongated drawbar 41 is positioned in recess 39, and is connected at its inner end by transverse horizontal pivot pin 43 to the sides of extension 37. The outer end of drawbar 41 protrudes outwardly through the end wall of member 31 and is bifurcated as at 45 to form a vertically open clevis. Drawbar 41 is restrained against any pivotal movement in the horizontal plane by the close spacing of the adjacent side walls of recess 39. The draft connection between the underframes is completed by connection 47 having a vertical eye 49 pivotally secured to clevis 45 by horizontal pivot pin 51, and a horizontal eye 53 positioned in recess 25 in end member 13 of underframe 3, and secured therein by vertical pivot pin 55, which is in the same transverse vertical plane as links 35. With this arrangement of drawbar 41 and eye connector 45, such relative movements are permitted between the underframes in the horizontal and longitudinal vertical planes of the underframes as may be required to accommodate the car to horizontal and vertical curvature of the track, and to accommodate lifting of underframe 3 by links 35 when rounding curves, but, because of the length of drawbar 41, only slight pivoting about pins 43 and 51 is necessary, so that the line of draft is substantially level and in substantially horizontal alignment with the two underframe center sills.

Operation of the car is as follows: On level tangent track the elements are as shown in the drawings with links 35 vertically disposed and drawbar 41 and eye connector 47 aligned with the aligned center sills of the two cars. Upon entering a curve, angulation of the underframes relative to each other will in the horizontal plane be accommodated by pivoting of eye member 53 of connector 47 about pin 55, the axis of which is in the same vertical transverse plane as links 35, and the link 35 on the outside of the curve will swing away from underframe 1 and toward underframe 3 while the link 35 on the inside of the curve will swing toward underframe 1 and away from underframe 3, both links at all times supporting underframe 3 by means of hooks 33. When vertical curvature is encountered, necessary angulation of the underframes with respect to each other is accommodated by pivoting of drawbar 41 about horizontal pin 43 with respect to underframe 3 and about horizontal pin 51 with respect to eye connector 47 and underframe 1.

The details of the structure may be modified substantially without departing from the spirit of the invention and the exclusive use of such modifications as come within the scope of the appended claims is contemplated.

What is claimed is:

1. An articulated railway car comprising a first elongated underframe, a truck supporting an end of said first underframe, a second underframe normally aligned longitudinally with said first underframe and spaced from the truck-supported end thereof, links depending from the truck-supported end of said first underframe adjacent the sides thereof, elements on the adjacent end of said second underframe adjacent the sides thereof and supported by said links, and a center draft connection between said underframes comprising a rigid member elongated lengthwise of the car and pivotally secured on a horizontal axis at its inner end to said second underframe, an element comprising a vertical eye and a horizontal eye connecting the outer end of said elongated member to said first underframe for pivotal movement with respect thereto about a horizontal axis and a vertical axis in substantial alignment transversely of the car with said links, said links and said vertical pivotal axis being in proximate relation lengthwise of the car to the center of said truck, said first underframe being formed with upwardly facing hooks supporting said links and said second underframe link supported element comprising downwardly facing hooks normally disposed in substantial vertical alignment with said upwardly facing hooks.

2. An articulated railway car according to claim 1, in which said first underframe has a transversely elongated end member mounting said upwardly facing hooks and said vertical axis pivot and a downwardly facing pivot centerplate for support on said truck.

3. An articulated railway car according to claim 2, in which said second underframe has a transversely elongated end member mounting said downwardly facing hooks and formed with a central longitudinally elongated recess, said rigid elongated draft member being received within said recess and protruding from the end thereof.

References Cited

UNITED STATES PATENTS

| | | | |
|---|---|---|---|
| 8,451 | 10/1851 | Nebinger | 105—3 |
| 2,908,229 | 10/1959 | Furrer | 105—3 |
| 2,268,318 | 12/1941 | Urlinate | 105—4 |
| 2,462,666 | 2/1949 | Omar | 105—4 |
| 3,216,370 | 11/1965 | Kulieke | 105—4 |

ARTHUR L. LA POINT, *Primary Examiner.*

J. E. BABER, H. BELTRAN, *Assistant Examiners.*